June 30, 1970 — J. C. JENKINS — 3,517,901
PIPE HANGER
Filed Jan. 27, 1969
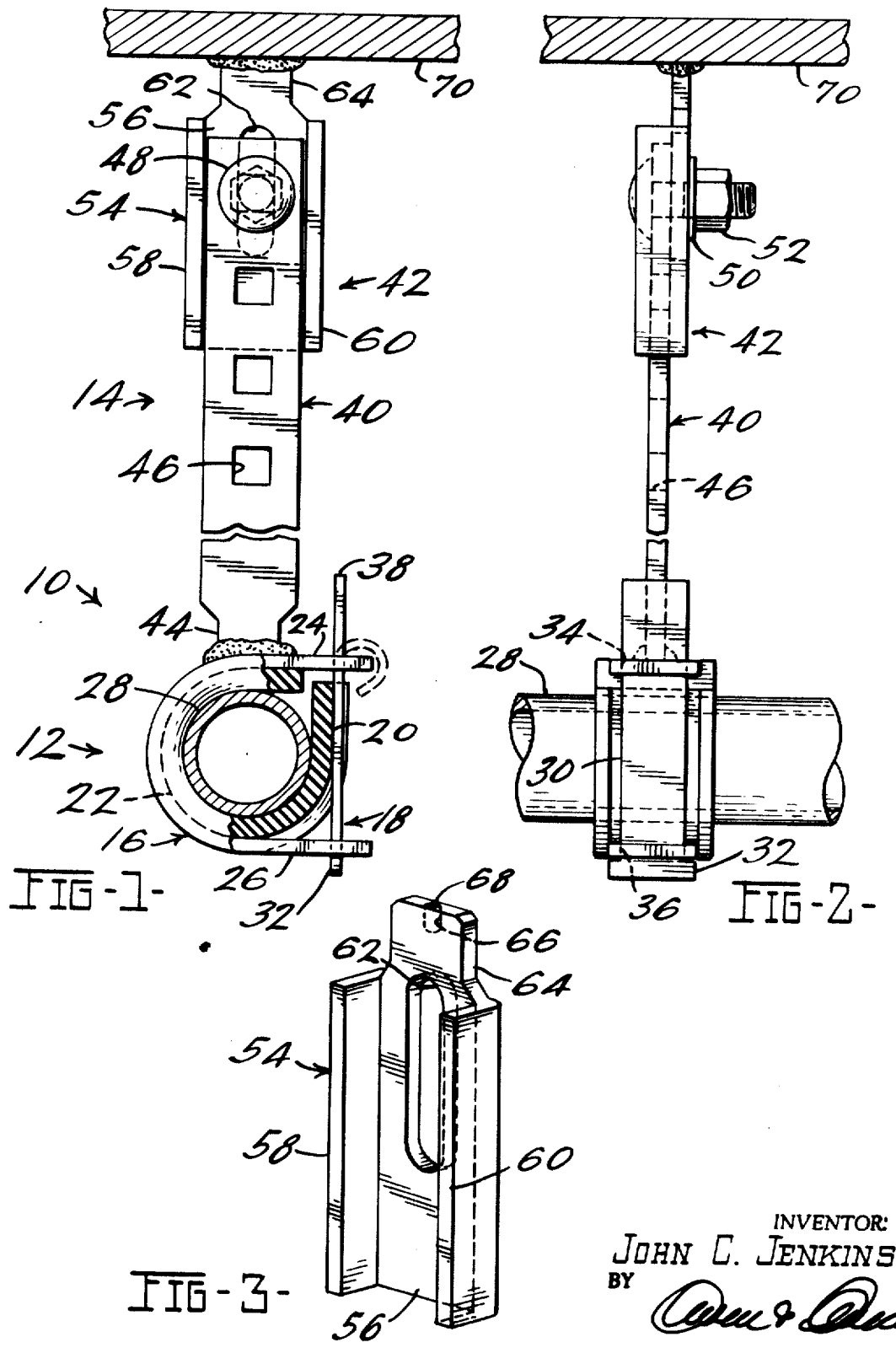
INVENTOR:
JOHN C. JENKINS.
BY
ATT'YS.

United States Patent Office 3,517,901
Patented June 30, 1970

3,517,901
PIPE HANGER
John C. Jenkins, Lorain, Ohio, assignor, by mesne assignments, to TRW Inc., Cleveland, Ohio, a corporation of Ohio
Continuation-in-part of application Ser. No. 680,911, Nov. 6, 1967. This application Jan. 27, 1969, Ser. No. 794,338
Int. Cl. F16l 3/10
U.S. Cl. 248—59                              7 Claims

ABSTRACT OF THE DISCLOSURE

A pipe hanger designed particularly for use on ships has an improved support for affixing the pipe hanger to a supporting surface, particularly an overhead. The support is preferably of a two-part configuration, one of which is welded directly to the overhead and the other of which is connected to the one part by a single fastener yet held rigidly with respect thereto. The support also is easily adjustable to position the pipe at any predetermined distance from the supporting surface.

---

This application is a continuation-in-part application of my co-pending application, Ser. No. 680,911 filed Nov. 6, 1967.

This invention relates to a hanger for elongate members and particularly to a pipe hanger with an improved support.

The new pipe hanger has a pipe-engaging unit which enables a pipe to be assembled therewith relatively easily and holds the pipe securely, being capable of withstanding substantial shock, as required on combat ships. The pipe-engaging unit is connected with a supporting surface of a ship, usually an overhead, by a support which is preferably of a two-part construction.

The support includes a supporting strap or bar affixed to a leg of the pipe-engaging unit with the major transverse dimension of the bar lying perpendicular to the axis of the pipe held by the unit and parallel to the longitudinal extent of the leg. This provides maximum transverse stability for the pipe through the single support. The second part of the support is a stud which is welded to the supporting surface and has a shank of U-shaped transverse cross section in which is received the upper end of the bar. The legs forming the U-shape of the stud shank fit closely with the edges of the supporting bar to provide transverse stability or rigidity therebetween. The bar can be affixed to the stud by a single fastener to enable installation in a minimum of time. The bar preferably has a plurality of uniformly-spaced openings extending longitudinally thereof which can receive the fastener, and the stud has a central slot extending longitudinally to receive the fastener and enable a degree of vertical adjustment of the pipe-engaging unit and the bar. Where the spacing between the pipe-engaging unit and the supporting surface is subject to wide variation, the supporting bar can be cut to the appropriate length prior to assembly with the stud.

It is, therefore, a principal object of the invention to provide a pipe hanger, with an improved support, particularly for use with pipes on ships, having the advantages discussed above.

Numerous other objects and advantages of the invention will be apparent from the following detailed description of a preferred embodiment thereof, reference being made to the accompanying drawings, in which:

FIG. 1 is a fragmentary front view in elevation of a pipe hanger embodying the invention and showing a pipe carried thereby in dotted lines;

FIG. 2 is a fragmentary side view in elevation of the pipe hanger of FIG. 1; and FIG. 3 is an enlarged view in perspective of part of a support of the hanger of FIGS. 1 and 2.

Referring particularly to FIGS. 1 and 2, a pipe hanger embodying the invention is indicated at 10 and includes a generally U-shaped pipe-engaging unit 12 and a support 14. The pipe-engaging unit 12 includes a one-piece metal strap 16 and a locking bar 18, along with a resilient liner 20. The unit 12 preferably is designed to accommodate a single size of pipe, with six sizes of the unit being effective to accommodate nominal size pipes ranging from one-half inch to two inches in diameter.

The strap 16 includes a central, curved portion 22, an integral upper leg 24, and an integral lower leg 26. The upper and lower legs 24 and 26 preferably form a C-shape configuration with a side opening into which a pipe, indicated by dotted lines 28, can be inserted and be supported temporarily until the locking bar 18 is assembled with the strap 16. This position of the strap 16 thus substantially facilitates installation of the pipe. The locking bar 18 is generally T-shaped with a stem 30 and a head 32. The stem 30 is inserted through openings 34 and 36 in the legs 24 and 26 with a protruding portion 38 then bent over by a suitable tool, such as pliers, to a curved position, as shown in dotted lines in FIG. 1.

The support 14 for the pipe-engaging unit 12 preferably is of two-part construction, including a supporting bar or strap 40 and a supporting stud 42. The supporting bar 40 has a lower end 44 preferably of slightly reduced size which is welded to the strap 16. The bar 40 preferably is welded to the upper leg 24 of the strap 16 to position the opening to one side, as shown. This enables the pipe to be inserted into the unit 12 and be temporarily supported prior to assembly of the locking bar 18. The bar 40 is affixed to the unit 12 with the major transverse dimension of the bar lying parallel to the longitudinal extent of the leg 24 and perpendicular to the axis of the pipe 28 being supported. This enables the support 14 to provide exceptional transverse stability for the pipe, particularly when subjected to shock. The bar 40 also has a plurality of substantially uniformly spaced openings 46 which preferably are square to receive a carriage bolt 48, although other suitable fasteners can be employed. The single bolt 48, along with an optional washer 50 and a self-locking nut 52, are sufficient to provide an effective and secure connection between the bar 40 and the stud 42.

The stud 42 has a generally U-shaped shank 54 including a main web 56 and legs 58 and 60 which are spaced apart a distance slightly in excess of the width of the bar 40 to fit closely or contiguously with the longitudinal edges of the bar 40 and to maintain transverse rigidity between the two even though only the single fastener 48 is employed. The web 56 of the shank 54 has a slot 62 extending longitudinally thereof to receive the shank of the fastener 48. The slot 62 enables some vertical adjustment of the bar 40 to provide final alignment for the pipe 28 carried by the unit 12. In the event the pipe is a drainpipe and is required to be supported on a slight slope, the slot 62 also enables the hanger 10 to accommodate this slope over a portion of the length of the pipe. The stud 42 also has a neck or extension 64 integral with and extending from one end of the web 56 beyond the legs 58 and 60. As shown in FIG. 3, the extension 64 has a central recess 66 therein which is filled with a body or slug 68 of solid flux. The flux facilitates welding of the extension 64 of the stud 42 to a supporting surface 70 which usually is an overhead of a ship. The stud 42 can be affixed to the surface 70 by a known stud welding cycle using a drawn-arc technique to effect the weld.

For the installation of the hanger 10 and the pipe 28, the stud 42 is first welded to the overhead in the desired position. The pipe-engaging unit 12 and the supporting bar 40, which are preferably prefabricated by a supplier, are then assembled with the stud 42. With the bar 40 of the desired length, the upper end is placed against the stud web 56, between the legs 58 and 60, and the fastener 48 is inserted through the upper opening 46 and through the slot 62, with the nut 52 then assembled with the shank of the fastener 48, the washer 50 being optional. The pipe 28 is then inserted in the pipe-engaging unit 12 where it is temporarliy supported on the lower leg 26. The locking bar 18 is next assembled by inserting the shank 30 through the openings 34 and 36 and bending over the tip portion 38 of the shank. With the pipe 28 positioned at its final, desired height, the nut 52 can then be tightened to complete the assembly.

If the pipe 28 is initially temporarily in position, the stud 42 can be welded to the overhead and the pipe-engaging unit 12 placed on the pipe. The supporting bar 40 is loosely assembled with the stud 42 by means of the bolt 48. The locking bar 18 is then assembled and crimped to lock the pipe and the bolt 48 is tightened to complete the assembly.

The bar 40 can be supplied with the unit 12 in several different lengths, such as four, eight, twelve, sixteen, and eighteen inches. This enables almost any spacing of the pipe 28 from the supporting surface 70 to be achieved in cooperation with the stud slot 62. If desired, the bar 40 can be supplied in fewer lengths, in which case the upper end of the bar 40 can be cut off to meet a particular spacing requirement.

It will be seen from the above that the hanger embodying the invention has a number of advantages over those heretofore known. In particular, the hanger provides maximum ease of installation of the pipe. The arrangement of the bar 40 and the pipe-engaging unit 12 also provides maximum transverse stability for the pipe, along with cooperation between the stud 42 and the bar 40, even with the use of only one fastener. The overall hanger also is of relatively simple design and low in cost.

Various modifications of the above described embodiment of the invention will be apparent to those skilled in the art and it is to be understood that such modifications can be made without departing from the scope of the invention, the embodiment shown and described being primarily for purposes of illustration and not limitation.

I claim:

1. A pipe hanger comprising a heavy, one-piece metal strap of generally C-shaped configuration when in a position of common use, said strap including a central portion, and a pair of spaced end legs, each of said end legs having at least one opening therein, a locking member extending through both of said leg openings for holding a portion of a pipe within the space defined by said strap, a flat supporting bar affixed to one of said legs for making a connection with a fixed support, said bar having a major transverse dimension parallel to the longitudinal extent of said strap legs, a stud for affixing said supporting bar to a supporting surface, said stud comprising a shank having a U-shaped cross section including a web and a pair of legs spaced apart a distance slightly greater than the width of the supporting bar whereby said shank receives the end of said bar with the edges lying close to said stud legs, said web having an extension integral with and extending from an end thereof, said extenison having a recess receiving a body of flux, and a single fastener connecting said shank and said bar.

2. A pipe hanger according to claim 1 characterized further by said strap having an opening in an end thereof and said shank web having a slot extending longitudinally thereof with said fastener extending through said opening and said slot.

3. A pipe hanger according to claim 2 characterized further by said supporting bar having a plurality of said openings substantially uniformly spaced over at least a portion of the length thereof.

4. A pipe hanger comprising a heavy, one-piece metal strap of generally C-shaped configuration when in a position of common use, said strap including a central portion and a pair of substantially straight end legs, each of said end legs having at least one elongate opening therein extending parallelly to the axis of a pipe to be held by the hanger and extending transversely of said end legs, a flat locking member extending through both of said leg openings for aiding in holding a portion of a pipe within a space defined by said strap, said flat locking member lying in a plane parallel to the axis of the pipe, said locking member having means formed at one end to prevent movement of said end of said locking member through one of said openings, the opposite end of said locking member extending beyond the other of said openings and being transversely bendable to a locking position and effective to urge said legs toward one another to engage and hold the pipe securely, said central portion and portions of said legs of said strap being adapted to be positioned adjacent the outer surface of the pipe when in assembled relationship therewith to hold the pipe securely against transverse movement, and a flat supporting bar affixed to one of said legs for making a connection with a fixed support, said bar having its major transverse dimension parallel to the longitudinal extent of said strap legs and transversely to the axis of the pipe to be held.

5. A pipe hanger comprising a heavy, one-piece metal strap of generally C-shaped configuration when in a position of common use, said strap including a central portion and a pair of spaced end legs forming an opening to receive a pipe, said strap being effective to temporarily hold the pipe prior to completion of assembly of the pipe and hanger, each of said end legs having at least one opening therein in general alignment with one another, a locking member extending through both of said leg openings for holding a portion of a pipe within the space defined by said strap, said locking member having means formed at one end to prevent movement of said end of said locking member through one of said leg openings, the opposite end of said member extending beyond the other of said leg openings and being transversely bendable to a locking position and effective to urge said legs toward one another to hold the pipe securely therebetween, a flat supporting bar of rectangular cross section affixed to one of said legs of said strap, a weldable stud having a shank of U-shaped cross section receiving an upper portion of said supporting bar with an end of said stud extending beyond the end of said supporting bar and carrying a centrally loaded body of flux, and means connecting said stud and said supporting bar.

6. A pipe hanger according to claim 5 characterized by the leg portions of the U-shaped shank of said stud lying contiguous with the edges of said supporting bar to hold said bar from transverse movement relative to said stud.

7. A pipe hanger according to claim 5 characterized by said locking member comprising a generally T-shaped bar having a shank extending through openings near the ends of the legs of said strap.

(References on following page)

References Cited

UNITED STATES PATENTS

| | | | |
|---|---|---|---|
| 1,022,409 | 4/1912 | Foster | 248—70 |
| 2,339,565 | 1/1944 | Goldberg | 248—59 X |
| 1,612,959 | 1/1927 | Zifferer | 248—59 |
| 2,993,982 | 7/1961 | Glover | 219—98 X |
| 3,044,739 | 7/1962 | Attwood | 248—58 |
| 3,265,340 | 8/1966 | Attwood | 248—62 |

CHANCELLOR E. HARRIS, Primary Examiner

U.S. Cl. X.R.

248—327